March 11, 1958    R. L. ATKIN    2,826,456
TIRE RIM
Filed Dec. 29, 1954    2 Sheets-Sheet 1

INVENTOR.
RUPERT L. ATKIN.
BY

March 11, 1958  R. L. ATKIN  2,826,456
TIRE RIM

Filed Dec. 29, 1954  2 Sheets-Sheet 2

INVENTOR.
RUPERT L. ATKIN.
BY

United States Patent Office 2,826,456
Patented Mar. 11, 1958

2,826,456

TIRE RIM

Rupert L. Atkin, Grosse Pointe Woods, Mich., assignor to Kelsey-Hayes Company, a corporation of Delaware Application December 29, 1954, Serial No. 478,303

2 Claims. (Cl. 301—11)

The invention relates to tire rims and has for one of its objects to provide an improved tire rim which is so constructed that it can be readily and accurately mounted on a wheel body.

Other objects of the invention will become apparent from the following description taken in connection with the accompanying drawings in which—

Figure 2:
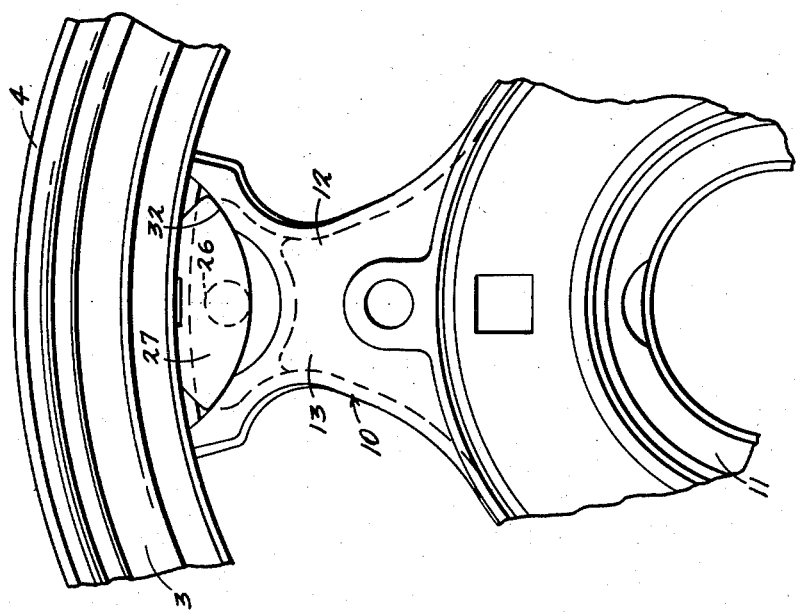
Figure 2 is an inboard elevation.
Figure 1:
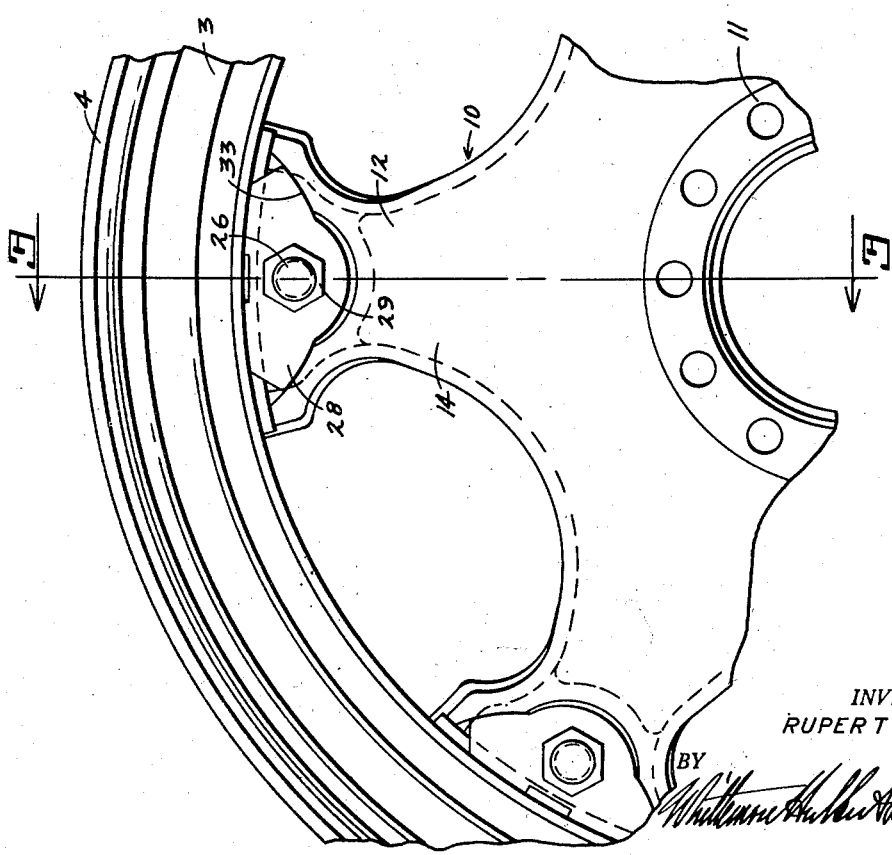
Figure 1 is an outboard elevation of a portion of a wheel having a tire rim embodying the invention.
Figure 3:
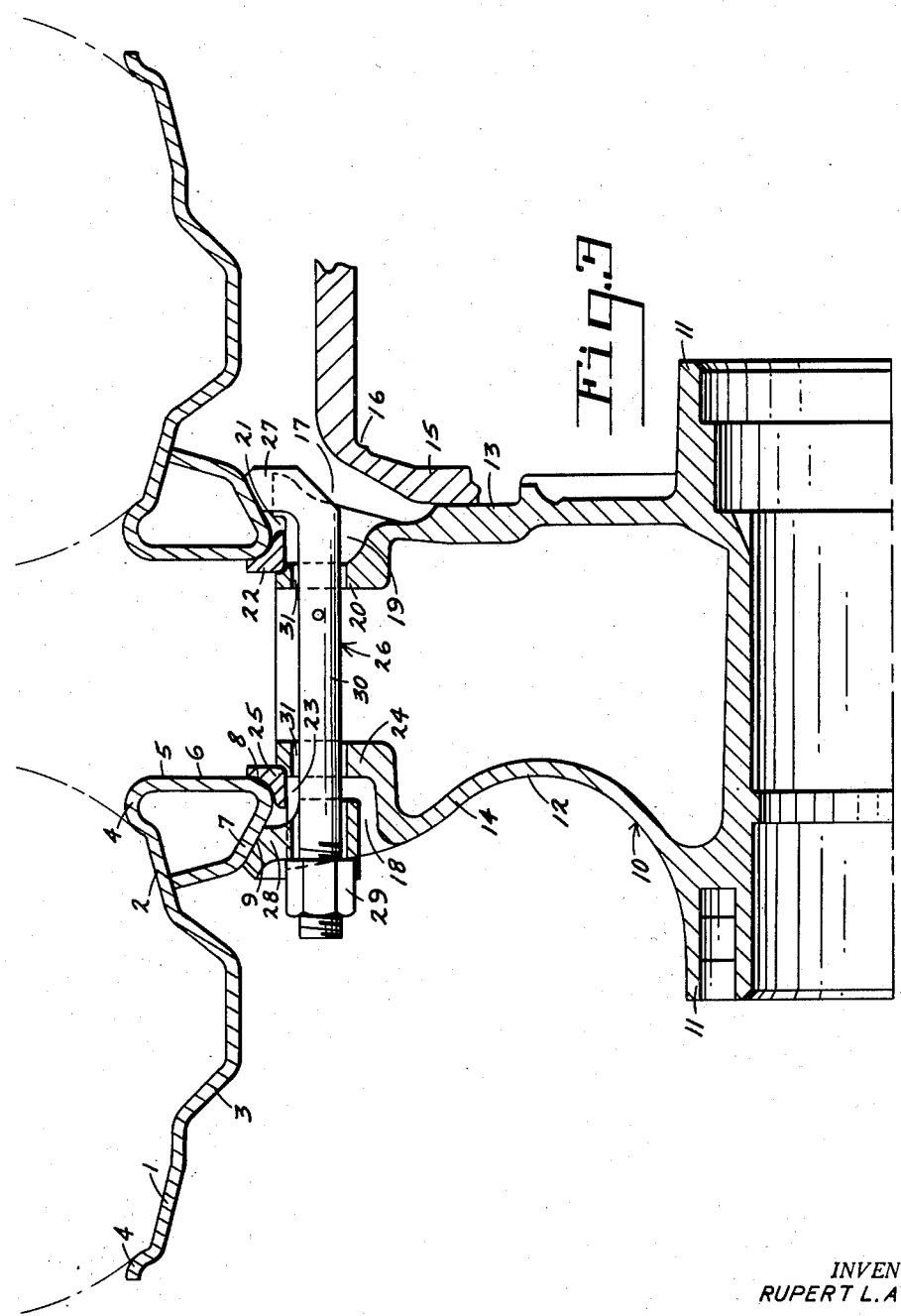
Figure 3 is a cross-section on the line 3—3 of Figure 1.

The tire rim is a one-piece rim of the drop-center type. The rim is an endless annular member having the axially spaced annular tire bead seats 1 and 2, the annular well 3 between and integral with the bead seats, the annular tire retaining flanges 4 integral with and at the edges of the bead seats spaced from the well and the annular mounting 5 integral with and connecting into one of the flanges 4 and extending within the adjacent bead seat 2. The bead seats 1 and 2 flare outwardly in opposite directions from the well 3.

The annular mounting 5 is a hollow bead having the portion 6 extending radially inwardly from the radially outer edge of the flange 4 and the return bent portion 7 extending from the radially inner edge of the portion 6 and abutting the bead seat 2. The radially extending portion 6 provides a radial surface 8 and the return bent portion 7 provides a frusto-conical surface 9 with the two surfaces 6 and 9 facing in generally opposite directions for engagement with a seat and a clamp to detachably mount the rim on a wheel body. The part of the return bent portion which abuts the bead seat 2 is at a greater angle to the axis of the rim than the part having the frusto-conical surface.

The construction of rim is such that it is adapted particularly for use with a tubeless tire casing to form a tubeless tire.

As shown in the present instance the rim forms part of a dual rim wheel having the wheel body 10 formed with the hub 11 and the spokes 12 radiating from the hub. The spokes are hollow and have the inboard and outboard side walls 13 and 14 respectively, the inboard side wall having co-planar inboard faces against which the web 15 of the brake drum 16 is secured. The spokes are formed at their radially outer ends with the inboard and outboard pockets 17 and 18 respectively.

Each inboard pocket 17 opens radially outwardly and axially inwardly or in an inboard direction and has the side walls 19 and the end wall 20. The radially outer edges of the side walls are formed with the notches 21 for receiving the inboard aligning ring 22 which is transversely split and encircles the side walls and abuts the end walls of all of the inboard pockets. The inboard aligning ring provides a radial seat for engagement by the radial surface 8 of the inboard rim and also provides a pilot merging into the radial seat for centering the inboard rim.

Each outboard pocket 18 opens radially outwardly and axially outwardly or in an outboard direction and has the side walls 23 and the end wall 24. The radially outer edges of the side walls terminate short of the end wall so that the outboard aligning ring 25 may be readily sleeved over the side walls of the outboard pockets and against their end walls. The outboard aligning ring is of the same construction as the inboard aligning ring but is mounted on the wheel body in reverse relation. Also the outboard aligning ring functions in the same manner to center and seat the outboard rim which is reversely arranged as compared with the inboard rim.

The means for clamping the inboard and outboard rims to the aligning rings comprises the bolts 26, the clamps 27 and 28, and the nuts 29. The bolts 26 have the shanks 30 which extend freely through the enlarged openings 31 in the end walls 20 and 24. The clamps 27 slidably engage and are supported by spaced bearings 32 on the side walls of the inboard pockets 17 and provide radially outwardly facing frusto-conical surfaces of the same angle as and engaging the frusto-conical surfaces 9 of the inboard rim. The clamps are in the nature of heads integral with the bolt shanks at their inboard ends. The clamps 28 slidably engage and are supported by spaced bearings 33 on the side walls of the outboard pockets 18 and provide radially outwardly facing frusto-conical surfaces of the same angle as and engaging the frusto-conical surfaces 9 of the outboard rim. The clamps 28 are sleeved over the bolt shanks and are abutted by the nuts 29 which are threaded on the bolt shanks.

From the above description it will be seen that I have provided a tire rim adapted particularly to cooperate with a tire casing to form a tubeless tire and that the rim is constructed to be readily mounted on a wheel body to be concentric with respect thereto and to rotate in a path at right angles to the axis thereof.

What I claim as my invention is:

1. A tire rim comprising an endless annular member having an annular tire bead seat, an integral annular tire retaining flange at the axially outer edge of said bead seat, and an integral annular mounting bead having an annular portion extending radially inwardly from said flange and an annular return bent portion extending generally radially outwardly from the radially inner extremity of said first-mentioned portion, said return bent portion having a frusto-conical part connecting into said first-mentioned portion and a second frusto-conical part connecting into said first-mentioned part at a greater angle to the rim axis than said first-mentioned part, said second part forming substantially a right angle with said tire bead seat and the free end of said second part abutting said tire bead seat, said first-mentioned portion providing an annular radial surface facing axially outwardly and said first-mentioned part of said return bent portion providing a frusto-conical surface facing radially and axially inwardly, said surfaces being engageable with mounting means.

2. A tire rim comprising an endless annular member having spaced annular tire bead seats, integral annular tire retaining flanges at the axially outer edges of said bead seats, and an integral annular mounting bead having an annular portion extending radially inwardly from one of said flanges and an annular return bent portion extending generally radially outwardly from the radially inner extremity of said first-mentioned portion, said return bent portion having a frusto-conical part connecting into said first-mentioned portion and a second frusto-conical part connecting into said first-mentioned part at a greater angle to the rim axis than said first-mentioned part, said second part forming substantially a right angle with the tire bead seat adjacent said last-mentioned flange and the free end of said second part abutting said last-mentioned tire bead seat, said first-mentioned portion providing an annular radial surface facing axially away from the other of said flanges and said first-mentioned part of said return bent portion providing a frusto-conical surface facing radially inwardly and axially toward said other of said flanges, said mounting bead having at the bend between said first-mentioned portion and said first-mentioned part of said return bent portion a radially inner annular surface extending generally axially and flaring radially outwardly and merging into said radial surface, said radial surface being engageable with a radial seat, said frusto-conical surface being engageable with a clamp and said radially inner annular surface being engageable with a pilot to center the rim.

References Cited in the file of this patent

UNITED STATES PATENTS

| | | |
|---|---|---|
| 1,919,911 | Shoemaker | July 25, 1933 |

FOREIGN PATENTS

| | | |
|---|---|---|
| 275,223 | Italy | Dec. 12, 1928 |
| 413,550 | Italy | Aug. 3, 1945 |